US007703718B2

(12) United States Patent
Saint-Jalmes et al.

(10) Patent No.: US 7,703,718 B2
(45) Date of Patent: Apr. 27, 2010

(54) AIRCRAFT CABIN ARRANGEMENT AND STORAGE UNIT

(75) Inventors: Bruno Saint-Jalmes, Toulouse (FR); Andre Rezag, Toulouse (FR); Jason Zaneboni, Toulouse (FR)

(73) Assignee: Airbus, Blagnac (FR)

( * ) Notice: Subject to any disclaimer, the term of this patent is extended or adjusted under 35 U.S.C. 154(b) by 300 days.

(21) Appl. No.: 11/445,324

(22) Filed: Jun. 2, 2006

(65) Prior Publication Data

US 2007/0102577 A1 May 10, 2007

Related U.S. Application Data

(60) Provisional application No. 60/697,349, filed on Jul. 8, 2005.

(30) Foreign Application Priority Data

Jun. 10, 2005 (FR) .................................. 05 05903

(51) Int. Cl.
*B64D 11/06* (2006.01)

(52) U.S. Cl. .................................................. 244/118.6

(58) Field of Classification Search ............. 244/118.6, 244/122 R, 118.5; 5/118, 9.1; 297/188.08
See application file for complete search history.

(56) References Cited

U.S. PATENT DOCUMENTS

| | | | |
|---|---|---|---|
| 3,455,597 A | 7/1969 | Sherbert et al. | |
| 4,241,552 A | 12/1980 | Marulic | |
| 6,257,523 B1 * | 7/2001 | Olliges | 244/118.5 |
| 2001/0003962 A1 | 6/2001 | Park et al. | |

FOREIGN PATENT DOCUMENTS

| | | |
|---|---|---|
| EP | 1 314 643 A | 5/2003 |
| EP | 1 495 908 A | 1/2005 |
| FR | 991 729 A | 10/1951 |
| FR | 2 860 194 A | 4/2005 |
| WO | WO 2005/080196 A | 9/2005 |
| WO | WO 2006/021766 | 3/2006 |

* cited by examiner

*Primary Examiner*—Timothy D Collins
(74) *Attorney, Agent, or Firm*—Oblon, Spivak, McClelland, Maier & Neustadt, L.L.P.

(57) ABSTRACT

An aircraft cabin includes a longitudinal cabin wall, seats, transversal accesses, and at least one storage space. The seats are disposed in rows that are transversal relative to a longitudinal aisle. The transversal accesses permit access to the seats of the transversal rows closest to the cabin wall. At least one storage space is disposed in an immediate proximity of the longitudinal cabin wall and at a dead end of one of the transversal accesses. The dead end of the one of the transversal accesses is not entered by passengers of the aircraft cabin.

20 Claims, 3 Drawing Sheets

22 24 22 2 12 26 20

AIRCRAFT CABIN ARRANGEMENT AND STORAGE UNIT

BACKGROUND OF THE INVENTION

I. Field of the Invention

The present invention relates to an aircraft cabin interior arrangement and to storage units intended for such a cabin.

II. Description of Related Art

To attract more passengers, the airline companies are tending to increase the comfort offered to passengers during an airplane trip. In general, this increase in comfort means on the one hand that a larger individual space is reserved for each passenger and on the other hand that the passenger can carry more baggage with him into the aircraft cabin. Travelers often carry a garment such as a jacket, overcoat or similar item with them, and travel seated without it. It is therefore appropriate to provide a storage space, a coat rack for the jackets and other items of the travelers. The airline companies are demanding that the aircraft manufacturers provide a minimal wardrobe space per traveler, especially for business-class and first-class travelers.

In the known aircraft cabins, a wardrobe is therefore provided in addition to the other storage units at one end of the zone of the aircraft designed to accommodate the business-class and/or first-class passengers. This wardrobe is of fairly large size, because it must be able to hold at least one jacket per traveler in the zone in question. The space occupied by this wardrobe is large and makes it necessary to eliminate one half row or even one entire row of seats. In this case, the increase in comfort of the passengers is achieved at the sacrifice of the number of passengers who can travel.

BRIEF SUMMARY OF THE INVENTION

The objective of the present invention is therefore to provide an aircraft cabin interior arrangement in which storage of garments such as jackets, overcoats, etc. can be achieved without the need to reduce the number of available seats.

To this end, the invention proposes an aircraft cabin provided with:

- a longitudinal cabin wall,
- seats disposed in rows that are transversal relative to a longitudinal aisle, and
- transversal accesses permitting access to the seats of the transversal rows closest to the cabin wall.

According to the invention, this cabin is also provided with at least one storage space disposed in the immediate proximity of the longitudinal cabin wall and at the dead end of a transversal access.

In such an aircraft cabin, storage spaces of relatively small size are disposed in places that are not used for movement of travelers or of the flight crew or for other purposes. This makes it possible to spread the storage spaces around the cabin, instead of providing, as is the case in prior art aircraft, a storage space of large size at a given place in the cabin. In this way, it is possible to optimize the space available in the cabin and to obtain better profitability for the airline company that operates the corresponding aircraft.

In one embodiment of the invention, there is associated, with each seat disposed along the cabin wall, an accessory unit, for example, which has a width smaller than that of the seat and which, relative to the axis of the seat, is offset toward the cabin wall, and the depth of the storage space then advantageously corresponds substantially to the width of the accessory unit. In this way the entire "dead" space available at the end of the transversal aisle is used as storage space.

In another embodiment, which may be combined, for example, with the foregoing embodiment, it is provided that each seat is surrounded by a side wall defining a space intended for at least one passenger, that an opening is provided for access from a transversal access to a seat disposed along the cabin wall, and that the storage space extends substantially from the cabin wall to the opening permitting access to the seat. The size of the storage space is also optimized in this embodiment. It can also be provided, in this embodiment, that the height of the storage space corresponds substantially to the height of the side wall at the access opening.

To optimize the use of space in the aircraft cabin, the longitudinal aisle is preferably a single aisle. For still better optimization, at least two rows of seats are disposed in such a way that they face one another. In this alternative embodiment, a single transversal access then serves two rows of seats. Even in such a configuration, the storage space at the end of the transversal access is of sufficient size to accommodate the garments of the passengers of both half-rows of passengers.

The storage space provided in the present invention is preferably closed by at least one door. This storage space may be organized, for example, as a wardrobe.

The present invention also relates to an aircraft, characterized in that it is provided with at least one cabin such as described in the foregoing.

BRIEF DESCRIPTION OF THE DRAWINGS

Details and advantages of the present invention will be better understood from the description hereinafter with reference to the attached schematic drawings, wherein.

DETAILED DESCRIPTION OF THE INVENTION

Figure 1:
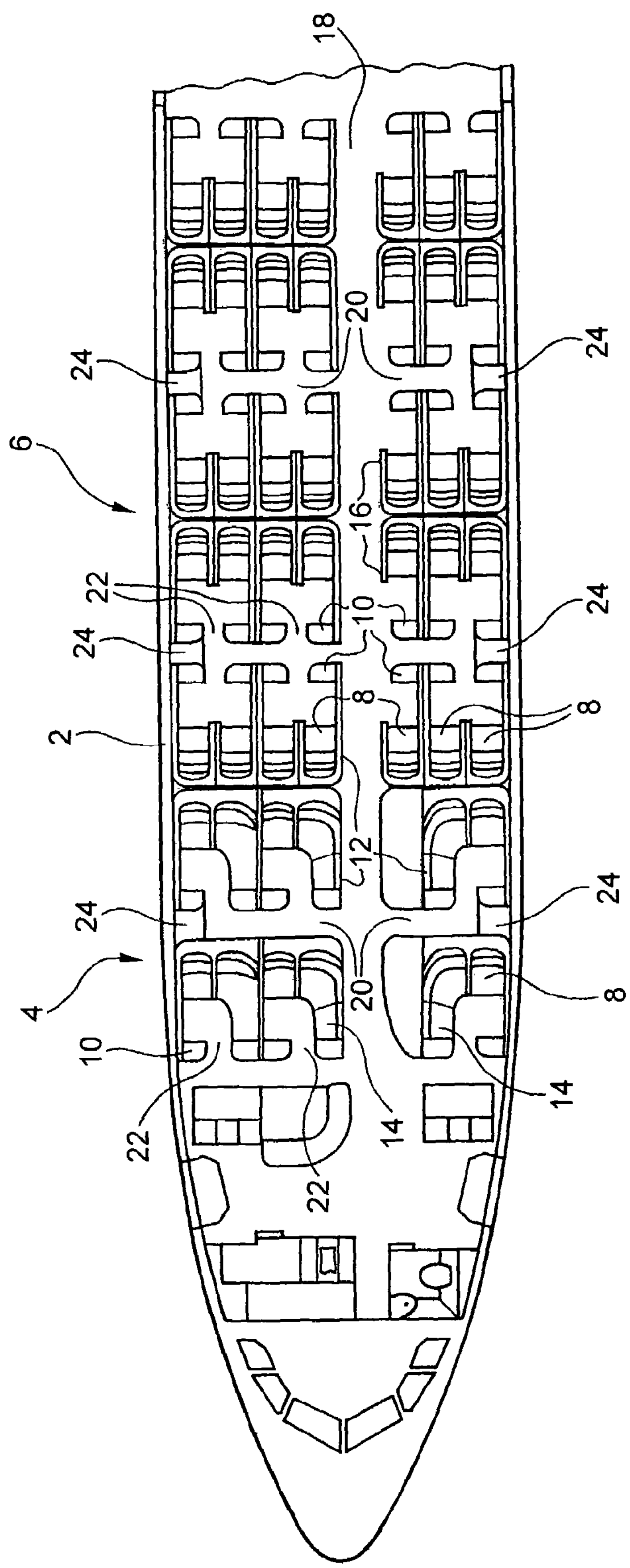
FIG. 1 is a horizontal projection of the aircraft cabin zone intended to accommodate the passengers traveling in first class and in business class.

FIG. 1 shows an airplane cabin segment. In traditional manner, this airplane cabin segment is constructed in a fuselage with the general shape of a round cylinder. This segment is defined laterally by a cabin wall 2. It is provided with a floor on which there are fixed the seats intended to accommodate passengers.

In the illustrated cabin segment, one zone is referred to as first-class zone 4, and a second zone is referred to as business-class zone 6. More space is available to the passengers in first-class zone 4 than to those in the business-class zone.

In both zones of the airplane cabin segment, each passenger is provided with a seat 8, equipped in traditional manner with a bottom, a back and two armrests. Facing each of these seats, and spaced apart therefrom, there is disposed an accessory unit 10, which may be, for example, a baggage compartment, a small table, a footrest or even a cabinet in which a television screen, for example, is integrated. Each accessory unit 10 is of width smaller than the corresponding seat 8. Preferably this accessory unit is provided with a support surface disposed substantially (for example, within 20 cm) at the same height as the bottom of corresponding seat 8. In the present case, each seat is a convertible seat. It can cooperate with the support surface of accessory unit 10 and possibly a supplementary berth in such a way as to form a sleeping surface providing a bed for the passenger. In a preferred embodiment, seat 8, accessory unit 10 and the possible supplementary berth are such as described in French Patent 2860194.

Figure 3:
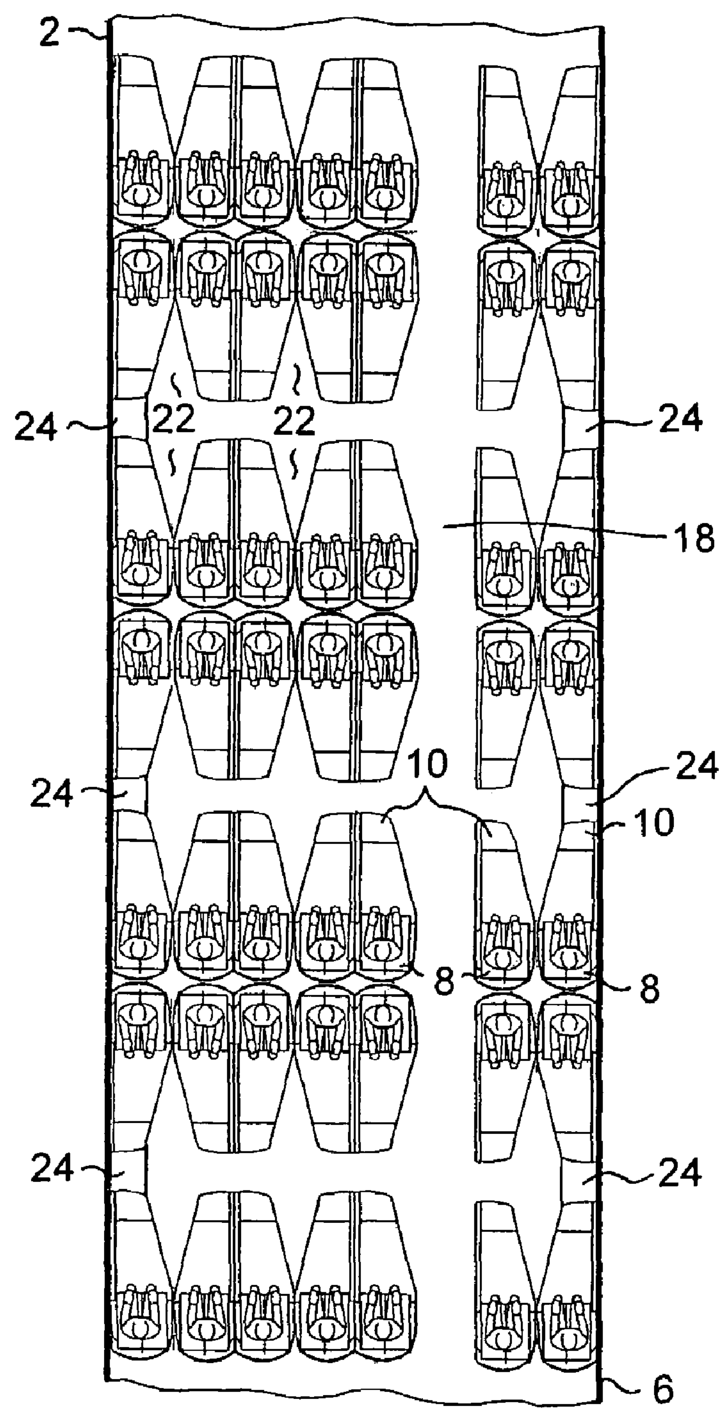
FIG. 3 is a horizontal projection of another example of an aircraft cabin segment according to the invention.

Three types of modules are illustrated in FIG. 1. First of all there are the modules located in first-class zone 4. Each of those modules is defined by a side wall 12, inside each of which there are disposed a seat 8 and a banquette 14. Business-class zone 6 contains modules of two different types. A first type of module is referred to as a double module and has a side wall 12 identical to that of the first-class modules. Inside each of these side walls 12 are two seats 8 positioned side-by-side and oriented in the same direction relative to the flying direction of the aircraft. There are also modules referred to as single modules, which correspond to modules of the same type as disclosed, for example, in French Patent 2860194 cited hereinabove. These single modules are also provided with a side wall 16 defining the space reserved for one passenger. Inside a side wall 16 there are disposed a seat 8 and a corresponding accessory unit 10. The embodiment of FIG. 3 is provided only with single modules such as described here.

In all of the aforesaid modules, accessory unit 10 corresponding to a seat 8 is of smaller width than that seat. In addition, this accessory unit 10 is offset relative to seat 8. In fact, seat 8 and the corresponding accessory unit are always disposed against the corresponding side wall. This side wall 12 or 16 has substantially rectangular general form. Thus accessory unit 10 is disposed in a corner, inside corresponding side wall 12 or 16. In some cases, therefore, accessory unit 10 is offset to the right of seat 8, and in other cases it is offset to the left of corresponding seat 8.

Here (FIGS. 1 and 3) the modules are disposed in such a way that, for all seats 8 disposed beside cabin wall 2, corresponding accessory unit 10 is offset, relative to the axis of seat 8, toward cabin wall 2.

It also is noted that the modules are disposed in rows in the aircraft cabin. In the first-class zone there are two rows of three modules, and all seats 8 in these two rows are oriented in the same direction, which corresponds to the flying direction of the airplane. In the business-class zone, the modules are also disposed in rows. Each row is composed of seven modules abreast. Here the modules are disposed in such a way that the passengers of one row, when they are seated on their seat, are facing in the opposite direction relative to the passengers seated on their seat in an adjacent row. Thus, in the first row of business-class zone 6 illustrated in FIG. 1, or in other words the row located next to first-class zone 4, the passengers seated on seats 8 are all facing the rear of the airplane and thus are traveling in the direction opposite the flying direction of the airplane. The passengers of the next row are seated in the opposite direction and therefore are facing in the direction of motion of the airplane. Considering two successive rows, therefore, it is noted that the modules of these rows are either back-to-back or face-to-face. FIG. 3 illustrates a similar cabin arrangement, again with seven seats abreast, but whereas the seats are in a 3+4 distribution in the embodiment of FIG. 1, FIG. 3 shows a 5+2 distribution of the seats.

Access to the modules is achieved on the one hand via a longitudinal aisle 18 and on the other hand via transversal accesses 20. In the case of first-class modules or of double business-class modules, access to the modules is achieved via an opening 22 provided at the center of one side of corresponding side wall 12.

Figure 2:
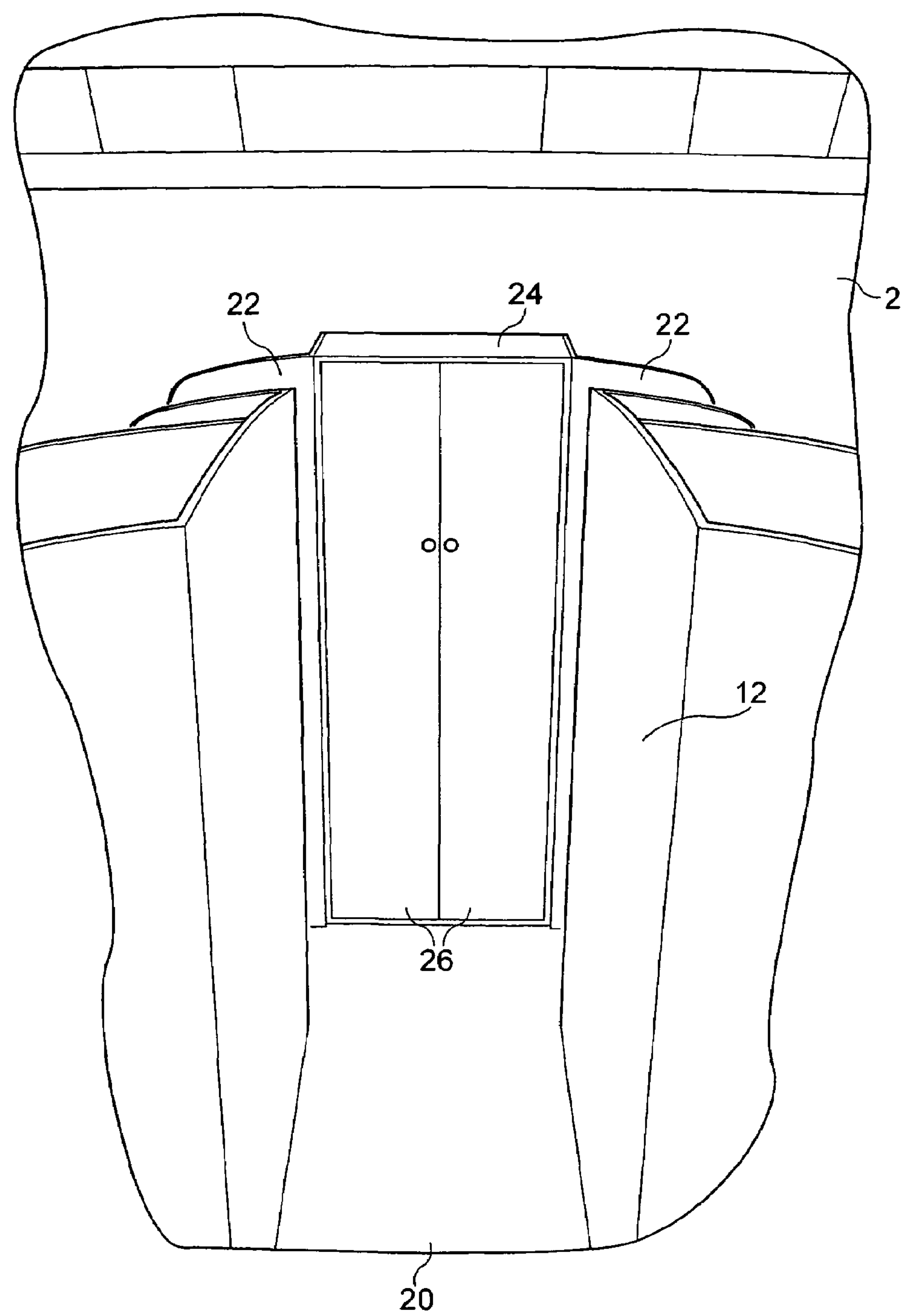
FIG. 2 presents a perspective view of a storage space according to the invention.

It is noted that, in such a configuration, the end of transversal accesses 20 is a "dead" zone, which never has to be entered. The present invention therefore proposes to provide a storage space 24 at this place. Such a space is illustrated in more detail in FIG. 2. This storage space 24 is disposed against cabin wall 2 and extends as far as openings 22 permitting access to the adjacent modules disposed against this cabin wall 2. This storage space 24 has the form of a wardrobe or of a closet, access to the inside of which can be achieved by means of two swinging doors 26, for example. In the embodiment illustrated in FIG. 2, the height of storage space 24 corresponds to the height of adjacent side walls 12 in proximity to this storage space 24.

This storage space 24 is sufficient for all the garments of the passengers traveling in the modules served by transversal access 20.

By disposing storage spaces 24 in this way, they are distributed throughout the aircraft cabin instead of being grouped at a single place. This means that there is no need to eliminate seats so that a wardrobe or similar unit can be installed. In addition, the garments can be stored closer to the travelers to whom they belong. This may prove to be practical if a passenger wishes to retrieve his garment or an object left therein.

The description provided in the foregoing corresponds to a configuration with a single longitudinal aisle. Nevertheless, the present invention can also be applied to aircraft cabin interior arrangements comprising two (or three) longitudinal aisles. The invention is then applied to the transversal accesses serving the modules (or seats) disposed next to the aircraft cabin wall.

Similarly, the practical example hereinabove provides for the case in which the space reserved for a passenger is defined by a side wall. The invention can also be applied to the case of an aircraft cabin interior arrangement without side wall. Similarly, the described seats are all seats that can be converted to beds. It would not be outside the scope of the invention if the seats of the cabin were exclusively inclinable seats or even fixed seats.

The described storage space 24 is a wardrobe. There could also be provided a baggage rack. It is also conceivable to combine with this storage space a display unit for information about the flight in progress, about the airline company, etc., or else a dispenser for beverages or other items, or else a screen for broadcasting pictures, information, etc., or even any other equipment that could be useful on board an airplane.

The present invention is not limited to the preferred embodiment described hereinabove as a non-limitative example, and to the mentioned alternatives. It also relates to all alternative embodiments that can be understood by the person skilled in the art within the scope of the claims hereinafter.

The invention claimed is:

1. An aircraft cabin, comprising:

a longitudinal cabin wall;

seats disposed in rows that are transversal relative to a longitudinal aisle;

a plurality of accessory units positioned separately from the seats, and each one of the accessory units is associated with one of the seats;

a plurality of side walls configured to define a plurality of modules and each of the plurality of modules includes at least one of the seats and the associated accessory unit;

transversal accesses permitting access to the seats of the transversal rows closest to the cabin wall; and at least one storage space disposed in an immediate proximity of the longitudinal cabin wall and at a dead end of one of the transversal accesses between at least two of the plurality of modules.

2. An aircraft cabin according to claim 1, wherein there is associated, with each of the seats disposed along the cabin wall, the accessory unit which has a width smaller than that of a corresponding seat and which, relative to an axis of the corresponding seat, is offset toward the cabin wall, and a depth of the storage space corresponds substantially to the width of the accessory unit.

3. An aircraft cabin according to claim 2, wherein each of the seats is surrounded by at least one of the side walls defining a space intended for at least one of the passengers, and one of the seats and the corresponding accessory unit are disposed against the surrounding side wall.

4. An aircraft cabin according to claim 1, wherein the longitudinal aisle is a single aisle.

5. An aircraft cabin according to claim 4, wherein at least two rows of the seats are disposed such that they face one another.

6. An aircraft cabin according to claim 5, wherein the storage space is positioned between the two rows of the seats that face one another.

7. An aircraft cabin according to claim 1, wherein the storage space is closed by at least one door.

8. An aircraft cabin according to claim 1, wherein the storage space is organized as a wardrobe.

9. An aircraft cabin according to claim 1, wherein each of the seats is surrounded by one of the side walls defining a space intended for at least one of the passengers.

10. An aircraft cabin according to claim 9, wherein a height of the storage space corresponds substantially to a height of the side wall.

11. An aircraft cabin according to claim 9, further comprising:

a banquette positioned adjacent to one of the seats and within the surrounding side wall.

12. An aircraft cabin, comprising:

a longitudinal cabin wall;

seats disposed in rows that are transversal relative to a longitudinal aisle;

transversal accesses permitting access to the seats of the transversal rows closest to the cabin wall; and at least one storage space disposed in an immediate proximity of the longitudinal cabin wall and at a dead end of a transversal access of the transversal accesses, wherein each of the seats is surrounded by a side wall defining a space intended for at least one passenger, an opening is provided for access from one of the transversal accesses to a corresponding seat disposed along the cabin wall, and the storage space extends between the cabin wall and the opening permitting access to the corresponding seat.

13. An aircraft cabin according to claim 12, wherein a height of the storage space corresponds substantially to a height of the side wall at the access opening.

14. An aircraft, comprising:

a cabin, the cabin comprising:

a longitudinal cabin wall;

seats disposed in rows that are transversal relative to a longitudinal aisle;

a plurality of accessory units positioned separately from the seats, and each one of the accessory units is associated with one of the seats;

a plurality of side walls configured to define a plurality of modules and each of the plurality of modules includes at least one of the seats and the associated accessory unit;

transversal accesses permitting access to the seats of the transversal rows closest to the cabin wall; and at least one storage space disposed in an immediate proximity of the longitudinal cabin wall and at a dead end of one of the transversal accesses between at least two of the plurality of modules.

15. An aircraft according to claim 14, wherein the accessory units associated with each of the seats disposed along the cabin wall each have a width smaller than that of a corresponding seat and which, relative to an axis of the corresponding seat, is offset toward the cabin wall, wherein a depth of the storage space corresponds substantially to the width of the accessory unit.

16. An aircraft according to claim 15, wherein each of the seats is surrounded by at least one of the side walls defining a space intended for at least one of the passengers, and one of the seats and the corresponding accessory unit are disposed against the surrounding side wall.

17. An aircraft according to claim 16, wherein a height of the storage space corresponds substantially to a height of the side wall.

18. An aircraft according to claim 16, further comprising:

a banquette positioned adjacent to one of the seats and within the surrounding side wall.

19. An aircraft according to claim 14, wherein at least two rows of the seats are disposed such that they face one another.

20. An aircraft according to claim 19, wherein the storage space is positioned between the two rows of the seats that face one another.

* * * * *